March 12, 1946.  S. J. EVERETT  2,396,254
GLASS MANUFACTURE
Filed Sept. 11, 1943
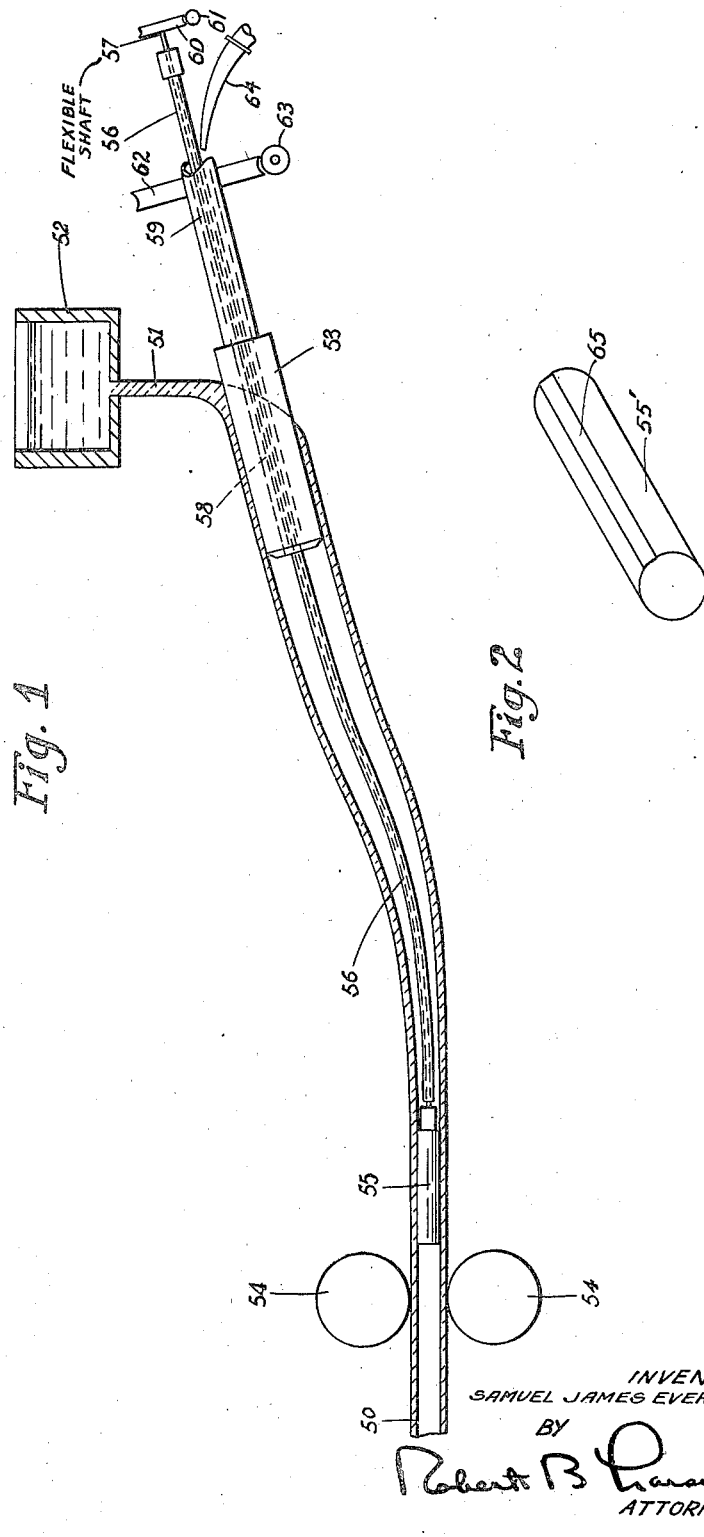
INVENTOR
SAMUEL JAMES EVERETT,
BY
Robert B Pearson
ATTORNEY Patented Mar. 12, 1946

2,396,254

UNITED STATES PATENT OFFICE 2,396,254

GLASS MANUFACTURE

Samuel James Everett, Thornton Heath, England, assignor to James A. Jobling & Company Limited, Sunderland, England, a British company Application September 11, 1943, Serial No. 502,009
In Great Britain February 8, 1941

2 Claims. (Cl. 49—17.1)

This invention relates to the manufacture of plastic tubes, particularly glass tubes, and this application is a continuation-in-part of my copending application Serial No. 420,121, filed November 22, 1941. Said application is concerned with the formation of tubes having extremely accurately shaped surfaces; that is to say, surfaces that are absolutely true and smooth with the fine quality that can be obtained by grinding and lapping or polishing. Glass tubing made either from ordinary glass or from low-expansion glass and having the qualities obtainable by making use of the present invention can conveniently be employed as cylinders for hypodermic syringes.

The invention is carried into effect by the adaptation of a known method of manufacturing glass tubing in which a ribbon of molten glass is poured on to a refractory mandrel which is set at an angle and slowly rotates at from four to ten revolutions per minute. The glass is drawn in tubular form from the lower end of the mandrel and becomes gradually less plastic as it travels away until, at a point which is from about ten to fifteen feet from the mandrel, the glass is cool enough to become rigid. Substantially at this point the tubing reaches a series of asbestos covered rollers over which it travels for about fifty to one hundred feet to a point where it is cut up into lengths. The cross-sectional dimensions, however, such as the bore of the tube cannot be accurately controlled, the variation being of the order of 7½% above or below the required diameter. In adapting this method, the present invention, on the other hand, enables tubing having very accurate cross-sectional dimensions to be produced. The adaptation is effected by passing the tubing over an accurately shaped former located at the point where the tubing is in a semi-plastic condition so that the internal or external diameter of the tubing is accurately controlled whilst the final setting of the glass takes place.

The present invention therefore comprises a method of forming a tube with a fine quality internal surface, said method including the features of delivering a ribbon of molten glass to a rotating refractory mandrel, withdrawing said glass in tubular form from said mandrel, passing said glass tubing over a former located at the point inside said tubing and remote from said mandrel where the glass is in a semi-plastic condition, and rotating said former about the axis of said tube.

The invention also includes apparatus for forming a glass tube with a fine quality internal surface, said apparatus comprising in combination a refractory mandrel, means for rotating said mandrel, means for delivering a ribbon of glass on to said mandrel, means for withdrawing the glass in tubular form from said mandrel, a former located remote from said mandrel to lie inside the glass tube at a point where the glass is semi-plastic, and a flexible driving connection for rotating said former about the axis of said tube and extending through said mandrel.

In order that the invention may be clearly understood and readily carried into effect a specific example thereof will now be described with reference to the drawing in which:

Fig. 1 is a sectional diagrammatic elevation of apparatus shown in the process of manufacturing a glass tube, and Fig. 2 is a diagrammatic perspective of a modified construction of the former.

The glass tube 50 is formed directly from a ribbon 51 of molten glass delivered from a suitable heated container 52 to a refractory mandrel 53 which, in practice is approximately two feet long, eight inches in diameter, and set at an angle of about seven degrees to the horizontal.

This mandrel is positively driven so that it rotates about its axis at from four to ten revolutions per minute. The glass is drawn in tubular form from the lower end of the mandrel 53 and becomes gradually less plastic as it travels away until, at a point which is about ten to fifteen feet from the mandrel 53, the glass is cool enough to become rigid. Substantially at this point the tubing reaches a series of asbestos covered rollers, two such rollers 54 being indicated in the drawing. These rollers serve to provide the necessary drawing action and the glass tubing 50 travels over them for about fifty to one hundred feet to a point where it is cut up into lengths. The tubing travels horizontally over the rollers so that, the plastic glass in passing from the inclined mandrel 53 to the rollers follows, under the force of gravity, a gently curved path. The inventive feature in this arrangement consists in passing the tubing over an accurately shaped rotating former 55, located at a point where the tubing is in a semi-plastic condition, so that the internal surface of the tubing is accurately controlled whilst the final setting of the glass takes place. The former 55 is rotated about its axis at a speed of approximately 70 revolutions per minute so as to produce an internal bore which is quite round, free from wrinkles and has the appearance of being polished as well as having precisely the required diameter. The former 55 is mounted at the end of a metal tube 56 extending upwards through the curved part of the glass tube and through the rotating refractory mandrel 53. The former 55 is driven by a flexible driving element 57 inside the metal tube 56 and extending between the former 55 and suitable driving means. The driving element 57 may be of any known construction, such as a pair of concentric helically wound heat resisting wires wound in opposite directions, or a series of universally jointed members. The former itself is made of pure silica, stainless steel or the nickel-chromium metal alloy "Inconell."

The drawing of the glass tube is not started with the former 55 in position, but when the drawing has been begun, the former assembly, including the flexible driving element 57 and the metal tube 56, is passed into position through a central passage 58 in the slowly rotating refractory mandrel 53. A pipe 59 constitutes an extension of this passage 58 and is used to convey air which is blown through the mandrel into the glass tube to prevent it from collapsing when in a plastic state.

In order to lubricate the glass tube as it passes in a semi-plastic state over the former 55, graphite in powder form or other suitable lubricant, such as lead oxide, may be carried in suspension by the air that is blown into the glass tube. Alternatively, a jet of air carrying lubricating powder may be blown down the metal tube 56 and discharged at the periphery of the former 55 so as to blow the lubricating powder on to the contacting surfaces respectively of the former and glass tube. It is to be understood that the plasticity of the glass and the speed of drawing in the vicinity of the former 55 is such that the air pressure does not prevent the glass from closely enveloping the rotating former 55.

The rotation of the former ensures that the inner surface of the tube shall be round, even if the former is not truly so (measurements of the order of 0.00001 inch being considered in this connection). The flexible shaft 57 may be rotated by any suitable means. In the drawing such means has been diagrammatically shown as comprising a worm wheel 60 secured to the shaft and adapted to be driven by a worm 61 rotated by a motor or other means (not shown). Similarly, the tube 59 may be rotated by a worm gear 62 and worm 63 driven by any suitable motive force.

In Fig. 1 there is also shown schematically a nozzle 64 for supplying air or air with lubricating powder suspended therein as described herein, it being understood that the nozzle 64 directs air into the tube 59.

The rotating former 55' as shown in Fig. 2 may be provided with a narrow flat surface 65 along one side so that the cross-section of the former appears as a circle with a small segment removed.

I claim:

1. Apparatus for forming a glass tube with a fine quality internal surface, said apparatus comprising, in combination, a refractory mandrel, means for rotating said mandrel, means for delivering a ribbon of glass on to said mandrel, means for withdrawing the glass in tubular form from said mandrel, a former located remote from said mandrel to lie inside the glass tube at a point where the glass is semi-plastic, and a driving connection for rotating said former about the axis of said tube and extending through said mandrel.

2. Apparatus for forming a glass tube with a fine quality internal surface, said apparatus comprising, in combination, a mandrel, means for rotating said mandrel, means for delivering a ribbon of glass on to said mandrel, means for withdrawing said glass in tubular form from said mandrel, a former located remote from said mandrel and disposed inside said glass tube at a point where said glass is semi-plastic, and a driving connection for rotating said former about the axis of said tube.

SAMUEL JAMES EVERETT.